No. 725,713. PATENTED APR. 21, 1903.
C. W. HUNT.
MOTOR VEHICLE.
APPLICATION FILED JUNE 16, 1902.
NO MODEL. 2 SHEETS—SHEET 1.

No. 725,713. PATENTED APR. 21, 1903.
C. W. HUNT.
MOTOR VEHICLE.
APPLICATION FILED JUNE 16, 1902.
NO MODEL. 2 SHEETS—SHEET 2.

Attest:
A. N. Jesbera
M. A. Brayley

Inventor:
Charles W. Hunt
by Redding, Kiddle & Greeley.
Attys.

UNITED STATES PATENT OFFICE.

CHARLES W. HUNT, OF WEST NEW BRIGHTON, NEW YORK.

MOTOR-VEHICLE.

SPECIFICATION forming part of Letters Patent No. 725,713, dated April 21, 1903.

Application filed June 16, 1902. Serial No. 111,896. (No model.)

*To all whom it may concern:*

Be it known that I, CHARLES WALLACE HUNT, a citizen of the United States, residing in West New Brighton, borough of Richmond, city of New York, State of New York, have invented certain new and useful Improvements in Motor-Vehicles, of which the following is a specification, reference being had to the accompanying drawings, forming a part hereof.

This invention relates to vehicles propelled by reciprocating piston-engines; and the general purpose in view is to provide improvements in the support of engines of this type with relation to the driving-wheels. In accordance with the invention the engine is mounted upon the axle of the driving-truck, and provisions are made for driving the wheels of the truck therefrom. The truck is spring-suspended from the body of the vehicle, so that the engine-frame yields when the vehicle is started from a condition of rest, and the engine is therefore relieved.

The invention will be more fully described hereinafter with reference to the accompanying drawings, in which, for purposes of explanation of the nature of the invention, it is illustrated as embodied in a convenient and practical form.

Figure 1:
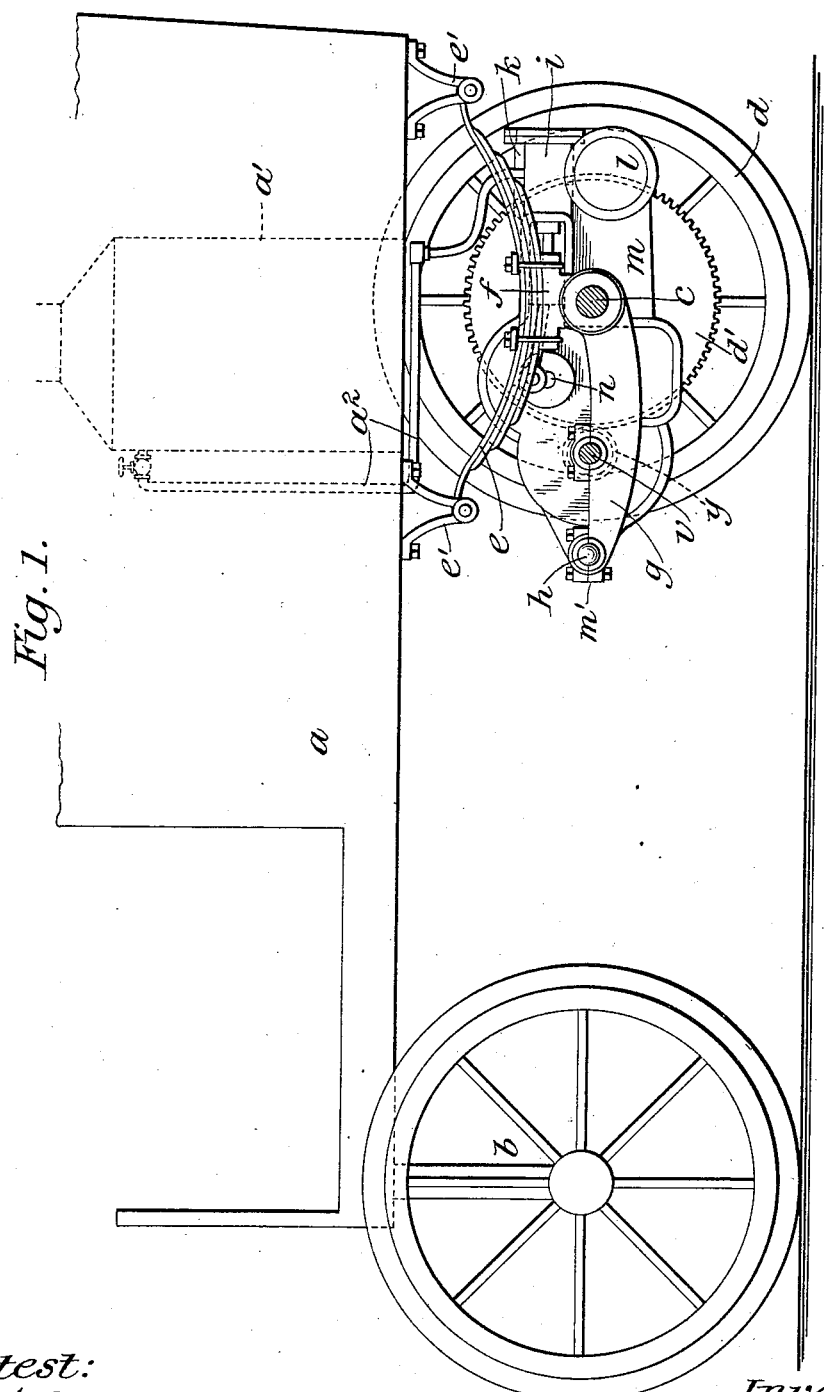
Figure 2:
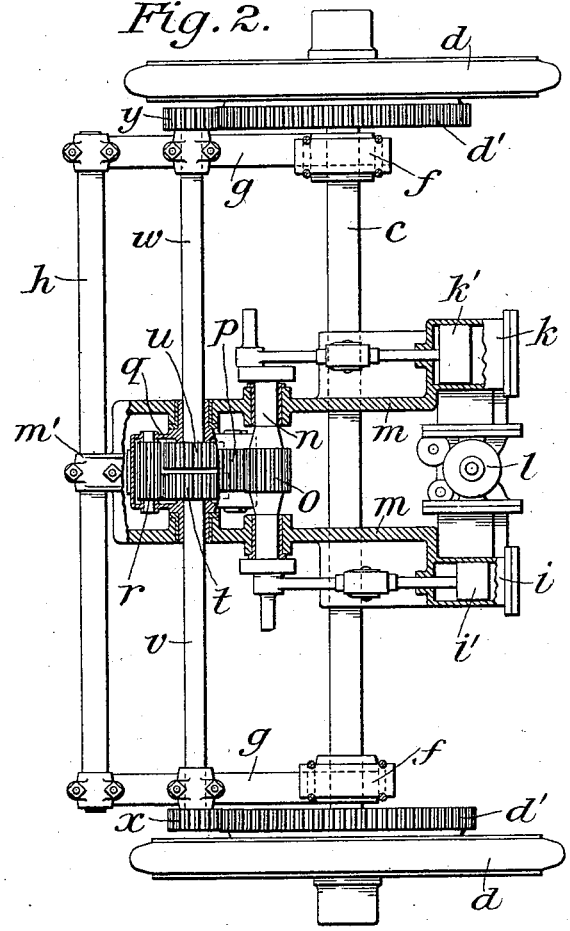
Figure 3:
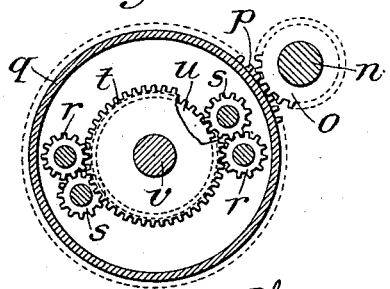

In the drawings, Figure 1 is a partial view, in side elevation, of a vehicle to which the invention is applied. Fig. 2 is a plan view of the driving-truck, partly in horizontal section. Fig. 3 is a detail section of the equalizing-gear.

The general construction and arrangement of parts of the vehicle may be as usual or as preferred, according to the particular use to which the vehicle is to be put. As represented in the drawings, the body $a$ may support the generator $a'$, which supplies the steam or other motive fluid to the engine through suitable pipes $a^2$. The forward or steering truck (indicated generally at $b$) may be constructed and arranged in any convenient manner, the present invention not being concerned with the steering of the vehicle.

The axle $c$ of the driving-truck is preferably a fixed axle, on the ends of which the driving-wheels $d$ are mounted to rotate in the usual manner. The driving-axle supports the body $a$ by springs, which may be arranged as indicated at $e$, the ends of the springs being secured to suitable brackets $e'$ and having the axles fastened to the springs in any suitable manner, as at $f$. An arm $g$ is extended from each end of the axle near the wheels, said arms being united to form, with the axle $c$, a frame for the support of the engine by a transverse rod or bar $h$.

The particular construction of the reciprocating piston-engine is not material to the present invention; but in the drawings it is shown as comprising two cylinders $i$ and $k$, one of which may be high-pressure, while the other is low-pressure, said cylinders having the valve mechanism and steam-chest arranged between them, as indicated at $l$. The cylinders are secured to or form parts of an engine casting or frame $m$, which is secured to the axle $c$ and is supported at its extremity, as at $m'$, upon the cross rod or bar $h$ of the supporting-frame. Each piston $i'$ and $k'$, respectively, is connected, as usual, with the crank-shaft $n$, which is supported in the engine casting or frame $m$. A gear $o$ on the crank-shaft may engage the outer gear $p$ on the shell $q$ of an equalizing-gear, such shell carrying pinions $r$ and $s$, which mesh with each other and mesh, respectively, with pinions $t$ and $u$ on the independent shafts $v$ and $w$. These shafts have bearings in the hubs of the gear-shell $q$ and in the arms $g$ of the supporting-frame and at their outer ends may carry pinions $x$ and $y$, respectively, which mesh, respectively, with gears $d'$ on the hubs of the driving-wheels $d$.

It will be seen that by the arrangement of the engine upon the axle the driving-truck becomes entirely self-contained and can be readily applied to any vehicle, no yielding connections between the engine and the driving-wheels having to be provided for and no connections of any kind having to be coupled or uncoupled save the connections for the supply of steam and the connections for the control of the valve mechanism, which can be easily manipulated. The arrangement of the driving mechanism, moreover, is exceedingly compact and simple and through the spring suspension of the axle upon which the engine is supported advantage of the yielding of the springs is had in starting the vehicle from the condition of rest.

It is not intended to limit the invention to the precise construction and arrangement of the engine, its driving connections, and its supporting devices herein shown and described, since the same can be varied without departing from the spirit of the invention.

I claim as my invention—

1. In a motor-vehicle the combination of an axle, driving-wheels, a reciprocating piston-engine mounted directly on the axle, driving connections independent of the engine and between the engine and the driving-wheels, and a supporting-frame for said connections also mounted on the axle, substantially as described.

2. In a motor-vehicle, the combination of a body, an axle-spring suspended therefrom, driving-wheels, a reciprocating piston-engine mounted directly on the axle, driving connections between the engine and the driving-wheels, and a supporting-frame for said connections independent of the engine and also mounted on the axle, substantially as described.

3. In a motor-vehicle, the combination of an axle, driving-wheels, a reciprocating piston-engine mounted directly on the axle, an independent supporting-frame, an engine-frame having one end supported on the first-named frame, and driving connections between the engine and the driving-wheels having bearings in said frames, substantially as described.

4. In a motor-vehicle, the combination of a body, an axle-spring suspended from the body, driving-wheels, a reciprocating piston-engine mounted directly on the axle, an independent supporting-frame, an engine-frame having one end supported on the first-named frame, and driving connections between the engine and the driving-wheels having bearings in said frames, substantially as described.

5. In a motor-vehicle, the combination of a body, an axle-spring suspended therefrom, driving-wheels, arms mounted on the axle, a transverse bar carried by said arms, an engine mounted directly on the axle, an engine-frame having one end supported on said bar, and driving connections supported by said engine-frame and said arms, substantially as described.

This specification signed and witnessed this 5th day of June, A. D. 1902.

CHARLES W. HUNT.

In presence of—
ANTHONY N. JESBERA,
M. A. BRAYLEY.